United States Patent [19]

Reinauer

[11] Patent Number: 4,813,831
[45] Date of Patent: Mar. 21, 1989

[54] COUPLING SYSTEM FOR CUTTING SHANK TOOLS

[75] Inventor: Josef Reinauer, Sigmaringen, Fed. Rep. of Germany

[73] Assignee: Gottlieb Guhring KG, Ebingen, Fed. Rep. of Germany

[21] Appl. No.: 167,234

[22] Filed: Mar. 11, 1988

[30] Foreign Application Priority Data

Mar. 11, 1987 [DE] Fed. Rep. of Germany ....... 3707836
May 11, 1987 [DE] Fed. Rep. of Germany ....... 3715659

[51] Int. Cl.$^4$ .......................... B23C 7/00; B23B 31/00
[52] U.S. Cl. ................................ 409/232; 408/239 R; 82/160
[58] Field of Search ............... 409/232, 233, 234, 230; 408/239 R, 239 A, 226, 238; 82/36 A, 36 R, 36 B; 403/292, 362

[56] References Cited

U.S. PATENT DOCUMENTS

| | | | |
|---|---|---|---|
| 2,051,965 | 8/1936 | Roth | 409/232 X |
| 3,994,615 | 11/1976 | Narang | 408/226 |
| 4,063,843 | 12/1977 | Barkley et al. | 408/226 X |
| 4,557,642 | 12/1985 | Dudas et al. | 408/239 R |
| 4,604,009 | 8/1986 | Tennerstedt | 409/233 |
| 4,617,848 | 10/1986 | Eckle et al. | 82/36 A |
| 4,655,655 | 4/1987 | Schürfeld | 409/232 |
| 4,747,735 | 5/1988 | Erickson et al. | 409/234 |

FOREIGN PATENT DOCUMENTS

| | | | |
|---|---|---|---|
| 224226 | 12/1984 | Japan | 409/232 |
| 924885 | 5/1963 | United Kingdom | 408/239 R |
| 2094191 | 9/1982 | United Kingdom | 408/239 R |

*Primary Examiner*—William Briggs
*Attorney, Agent, or Firm*—Oblon, Fisher, Spivak, McClelland & Maier

[57] ABSTRACT

Described is a coupling system for cutting shank tools with which a stationary connection can be produced between coaxial parts of the shank tool in the direction of rotation and in the axial direction. The coupling system includes a holding fixture formed in a first part for a centering extension provided on a second part to be connected, a drive device, and a clamping device which can be actuated externally by an adjusting device and with which both parts can be pressed against each other through a prop ring surface pairing. The clamping device includes a connecting rod that is mounted symmetrically like a pendulum in the first part and that extends into a coaxial recess in the second part and forms a conical section there, through which the connecting rod can be placed under tension by the adjusting device braced on the second part. This generates pure axial tension which can be introduced, through a large, ring-shaped flat brace, without transverse force into the shank parts to be coupled.

50 Claims, 4 Drawing Sheets

COUPLING SYSTEM FOR CUTTING SHANK TOOLS

FIELD OF THE INVENTION

The invention relates to a coupling system for cutting shank tools with which a permanent connection between coaxial parts of the shank tool can be produced in the direction of rotation and in the axial direction.

BACKGROUND OF THE INVENTION

The technical development in the field of cutting shank tools in line with the increasingly higher cutting speeds and the use of program-controlled machine tools leads to tool systems built in modular fashion. For example, on a clamping cylinder of a tool holding fixture that is produced with great precision and thus is very expensive, a system of different tools is attached that must be interchangeable by means of a tool changer that operates automatically.

This development requires a specifically compatible coupling system which successfully guarantees, with sufficient quality, the power transmission from the tool holding fixture or the clamping cylinder to the tool, accuracy of concentricity, and the matching of the position of the tool cutting edges to the shank or to the holding fixture for the entire spectrum of tools that are to be coupled.

In this connection, a series of such coupling systems has already been suggested which, however, only partially fulfill the requirements mentioned above.

It has been suggested, for example, that the coupling be produced through a self-centering Hirth-type serration that, together with a spring chuck, assures an interlocking coupling of the parts to be attached to one another. This suggested solution is expensive as regards production and is limited, depending on the chucking system used, to the coupling point with the base holding fixture. In further coupling points must be provided in the shank region of the tool (for example, for the case where extension pieces or adaptors must be used), different couplings are needed. An automatic tool change is made more difficult in this way.

A further suggestion consists of the coupling of adjacent parts of the shank of the tool occurring through a centric screw coupling. It has been shown that this coupling techniques makes the use of automatic tool changer systems more difficult since, to disengage the coupling, a frontal access to the shank parts is necessary to be able to disengage the connection quickly. Further, it has grown disadvantageous that the coupling of tools with reduced shank diameter is possible only by a simultaneously relatively great increase in the separation of the tool cutting edge from the base holding fixture, which can have a negative effect on the precision of the machining operation.

Finally, to simplify the automated disengagement of the coupling between various shank parts, a solution has been suggested in which a cylindrical centering extension of a shank part is inserted into a holding fixture hole of the adjacent shank part. The outer surface of the centering cylinder contains two diametrically offset recesses that are undercut in the opposite direction so that, when corresponding positioning screws are screwed in, an immovable bracing of the shank part used relative to the holding fixture part can occur. Driving occurs through a mandrel that engages in an axial slot in the centering cylinder. If this is true, the coupling system can be used at any point on the shank tool. However, it assumes an axial position fixing of the shank sections to be coupled with one another during the tightening operation of the fastening screws, by which the use of automatic tool changer systems is made more difficult, since two clamping bolts must be actuated.

Further, a coupling system for a tool system built in a modular fashion has been suggested in which, with a single set screw that can be actuated laterally from outside, the parts that are to be coupled can be fixed in an immobile position relative to one another. For this, in the centering extension a fastening bolt is provided that is mounted to be slidably movable in a diametrically aligned guide hole. A front surface of the fastening bolt contains a conical recess, whereas the outer end surface of the fastening bolt has a conical outer surface. Through an adjusting device formed as a countersunk head bolt, the body of which is matched to the inner recess of the fastening bolt, there occurs a shifting of the fastening bolt in the diametrical bore hold so that the tapered outer surface can brace against a conical recess of a carrying bolt that can be screwed from the other side of the first fastening part. The axis of the fastening bolt is offset relatively to the axis of the countersunk head bolt and the carrying bolt so that, when the countersunk head bolt is screwed in, an axial force can be transmitted to the centering extension so that the parts to be coupled can be put under tension against each other through a prop ring surface pairing. To achieve the positioning and a coupling of both parts in the peripheral direction, an index pin is provided in the region of the prop ring surfaces.

Aside from the fact that, with this solution, a symmetrical distribution of contact pressure can be achieved only when there is a precisely controlled vane position of the support surfaces on the side of the supporting nut and the conical recess in the fastening bolt and, further, a precise alignment of the axial planes of the shank tool that run through the respective axes of the fastening bolt and the carrying bolt, as well as the countersunk head bolt, drawbacks can occur in the sense that, with the use of certain tools, rotating tool vibrations occur which can be countered only in a limited way by the present orientation and position of the support surfaces. Further, with this solution, when the centering extension is formed on the part nearer to the tool cutting edge, the tool system becomes basically more expensive. To counteract this problem, it was suggested that the coupling system be supplemented with an annexed spindle flange on which the centering extension for the holding fixture of the fastening bolt could be attached. However, this variant can lead, especially in shank tools with high thermal stress, to the fact that, when changing the tool (i.e., when putting on a new tool that does not yet have the higher operating temperature of the centering extension), fitting problems occur, due to which down time must be accepted.

OBJECT OF THE INVENTION

The object of the invention is to make a coupling system that is distinguished by easy operability, by an improved power transmission from the tool holding fixture to the tool, by a high accuracy of concentricity, and by a greater flexibility with regard to the tool parts to be coupled.

SUMMARY OF THE INVENTION

According to the invention, due to the fact that the connecting rod is mounted like a pendulum, an introduction of axial tension occurs without transverse forces, even when in fact there might be an eccentricity (caused by tolerances) of the support surfaces for the connecting rod. In this way a rotationally symmetrical power introduction into the prop ring surface pairing occurs. Thus a connection is made which makes it possible, from a structural view point, to keep the bending moment of resistance the same size in all axial planes. This prevents bending vibrations even when extremely strong forces act on the tool. In doing so, as always, an adjusting device accessible from the outside can be used that facilitates the use of automatic tool changer systems and also is uneffected in regard to the resolution of the occurring machining forces. The design further achieves the requirement that centering extension can be formed on that part which lies closer to the tool cutting edges. This makes the tool system more economical to produce and, in addition, the fitting problems described above in regard to tool changing (i.e., during the putting on of a tool part that has not yet reached the operating temperature of the adjacent parts) can be largely eliminated. In this the fact that the connecting rod is supported symmetrically assures that the entire structural space around the connecting rod can be used for the formation of the drive device. In this way a very greater flexibility results in regard to the design and matching of the drive device to the most varied part of a tool system.

By designing the adjusting device according to the invention, a very simply and fast operation results. This kind of adjusting device can be actuated without problems by automatic tool changer systems so that the coupling system according to the application can be integrated without problem into a manufacturing system with robotized tool changing.

When the connecting rod according to the invention is pressed by the set screw against two further support bodies, a centering of the tapered sleeve section occurs in a very simple way. In a particularly preferred embodiment, the additional advantage further results that a correction of manufacturing in accuracy is possible through the two adjustable screws.

It has been seen that, with a further development of the invention (i.e., with the bracing of the connecting rod on three points distributed equidistantly around the periphery), the bending moment of resistance can be kept sufficiently homogeneous in the various axial planes to counteract vibration problems or deviations of the cutting edge from the nominal position even with the greatest occurring tool forces. In doing so, one proceeds preferably so that, during the production process, the carrying bolts can be set once and sealed in this position.

A further development of the invention couples the mounting of the connecting rod with the drive device in an advantageous way. In addition this results, for torsional safety, in an indexation of the parts to be coupled with one another, and as alway a ring-shaped closed planar bracing of the parts to be pressed against one another is maintained. The integration of the recesses in the centering extension save space, but in doing so does not impair the quality of the centering. An additional advantage of this further development of the invention can be seen in the fact that it opens the possibility of coupling shank parts of varying diameters with one another so that as little axial structure space is lost as possible. This occurs in an advantageous way in that, to reduce the diameter, the drive ring and the connecting rod are elongated in an axial direction, and an intermediate ring is inserted between the prop ring surfaces of the parts to be coupled. In this way a diameter reduction from one size to various smaller sizes, even in multi-skip jumps, can occur in the region of a single coupling.

A further development of the invention allows a purposeful angle setting between the parts to be coupled with one another, and thus a multiple indexing of the tools so that the coupling system according to the invention is also suited for stationary tools (for example, for a rotating mechanism or a boring mill).

Attachment of the drive ring according to a further development of the invention results in a uniform and full installation of the drive ring in the base of the holding fixture, by which the fit between the claw extension and the recess in the centering extension can be produced more exactly.

A further development of the invention results in the possibility of indexing the tool cutting edge relative to the shank in angular increments of 30°. This results in an increased flexibility with regard to the use of the coupling system.

With a further development of the invention, an interlocking drive of the drive ring can successfully be made available with means that are simpler from a production engineering view point. In contrast to the embodiment described above, the production of the drive ring can be simplified, since the spacing of the tapped holes provided for the fastening screws in the holding fixture can no longer have a negative effect on the generation of a uniform contact pressure for the drive ring. By spatial separation of the functional surfaces for the drive in the peripheral direction on the one hand and in the axial force on the other other, the further possibility arises that the respective functional surfaces can be optimized without the necessity of a compromise.

A further development of the invention is advantageous from the production engineering view point, since in this way the indentation in the holding fixture can be produced easily.

A further development of the invention again gives rise to the possibility of indexing the cutting edge relative to the shank in angular increments of 30°, whereby the application possibilities of the coupling system are broadened.

According to a possible alternative to the axial fixation of the drive ring, only one side of the V-shaped annular slot, in regard to position, must be matched to the shape of the tapered sleeve surface of the fastening screw. The drive ring is pressed by the fastening screws flat with its radial shoulder adjacent to the drive extension against the base of the holding fixture.

Alternatively, a divided retaining ring can be used which is mounted with fit in an annular slot of the drive ring. To secure its position in the axial direction, the retaining ring can be spread radially outwardly in a corresponding perforation in the holding fixture.

A further development of the invention leads to especially simple geometrical functional surfaces on the respective components, by which it has been shown that, for a sufficient positioning in the axial direction, it suffices to design the front and the mating surfaces plane-parallel. To generate, in addition, an axial bracing of the drive ring against the radial surface in the base of the holding fixture during spreading of the retaining ring segments, it can be advantageous to design the front end facing away from the shoulder of the rectangular slot conically and to match the graduated surface in the recess to this design so that, with increasing spreading of the retaining ring segments, an increasing axial force is generated.

An especially simple solution to the generation of the spreading effect is obtained when two retaining ring segments are provided which can be spread by means of two diametrically offset expansion screws.

A further development of the invention ensures that, when the expansion screw is unscrewed, a return of the retaining ring segments into the slot of the drive ring occurs, so that the latter can be removed from the holding fixture without problems.

A further development of the invention achieves a very space-saving diameter change in the region of the coupling surfaces.

A further advantage of the coupling system according to the invention consists of its ability to be used without problems also for those shank tools (for example, boring tools) in which a central coolant supply is provided through the shank. In this case the connecting rod is provided with a continuous, preferably central, inner recess.

Below, several embodiments of the invention will be explained in more detail based on schematic drawings.

BRIEF DESCRIPTION OF THE DRAWINGS

FIG. 2 is a sectional view along the line III—III in FIG. 1.

DETAILED DESCRIPTION OF THE PRESENTLY PREFERRED EMBODIMENTS

Figure 1:
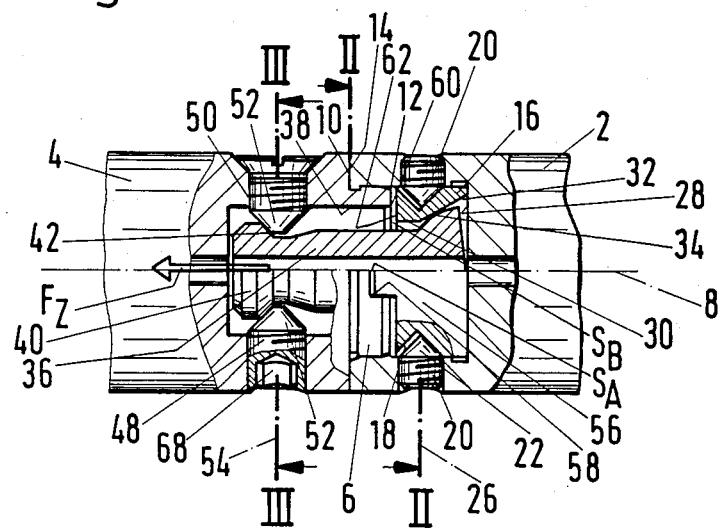
FIG. 1 is a sectional view of a first embodiment of the coupling system in a cut along the line I—I in FIG. 2.

In FIG. 1, the reference symbol 2 denotes a first part and the reference symbol 4 denotes a second part of a coupling that can be disengaged between coaxial shank parts of a machining tool such as, for example, a drill, a milling cutter, or a turning tool. The coupling can be at different points between the tool holding fixture of the machining tool and a cutting edge (not shown). The part which lies further from the cutting edge than the other part is always designated as the first part herein.

To produce a stationary connection in the axial direction and in the peripheral direction between the parts 2 and 4, which itself takes care of great tool and shank stability during very high torsion and bending moments applied on the tool cutting edges, a centering device to be described in more detail later, a drive device, and a clamping device are provided with which the coupling can be quickly released or locked.

For centering, the second part 4 has a centering extension 6 which is manufactured with the greatest possible precision with regard to the shank axis 8 and, in the axial runout, into a ring-shaped rotating support surface 10. The centering extension 6 is in fitting engagement with a cylindrical recess 12 in the first part 2. With regard to the manufacturing precision of the cylindrical recess 12, the same applies as what was said in connection with the centering extension 6. In the axial runout to the cylindrical recess 12, the first part 2 has a support surface 14 abutting the ring-shaped rotating support surface 10. The support surface 14 is also ring-shaped, so that a prop ring surface pairing 10, 14 is formed over which both parts 2 and 4 can be pressed against one another with a clamping device to be described in more detail below.

The cylindrical recess 12 is formed deeper than the axial length of the centering extension 6. In the base of the cylindrical recess 12 a drive ring 16 is fit in and fastened there in an interlocking fashion. For this purpose, the drive ring 16 has three conical indentations 18 that are at an angular distance to each other of 120°. Countersunk head bolts 20 each of which has a retaining tapered sleeve 22 can be screwed fittingly into the conical indentations 18. The countersunk head bolts 20 are mounted in tapped holes 24 in the first part 2. Each of the tapped holes 24 has an axis 26 that is offset toward the base of the cylindrical recess 12 relative to the axis, not further indicated, of the corresponding conical indentation 18. Accordingly, by tightening the countersunk head bolts 20, each of which is preferably provided with a hexagon socket, an axial pressing of the drive ring 16 against a base contact surface 28 occurs.

On the side facing the second part 4, the drive ring 16 has an essentially cylindrical inner recess 30 that merges, on the side facing the base contact surface 28, into a conical inner support surface 32. A support section 34 that is arched convex of a connecting rod 36 is in abutting contact with the conical inner support surface 32. The outer surface of the support section 34 is preferably formed by the surface of a spherical zone, which results in the mounting of the connecting rod 36 like a pendulum relative to the drive ring 16. The width of the essential cylindrical inner recess 30 is selected so that the connecting rod 36 is allowed sufficient movement like a pendulum.

The connecting rod 36 extends with its shaft into a recess 38 that is concentric to the shank axis 8 and that forms a clamping head 40 there which has a conical section 42 in the form of a truncated cone surface. In the region of the conical section 42, three countersunk head bolts 44, 46, and 48 are distributed equidistantly around the periphery. The countersunk head bolts 44, 46, and 48 are supported in radial tapped holes 50 in the second part 4. Each countersunk head bolt 44, 46, and 48 has a tapered sleeve section 52 the slope of which basically corresponds to the slope of the conical section 42 of the connecting rod 36. Preferably the axes, not further indicated, of the countersunk head bolts 44, 46, and 48 lie in a common radial plane 54 so that identically shaped tapered sleeve sections 52 and identically tapped radial tapped holes 50 can be used for the countersunk head bolts 44, 46, and 48. It can be seen from FIG. 1 that the position of the radial plane 54 is matched in such a way to the position of the conical section 42 that, when the connecting rod 36 is in its centered position due to the tightening of one or more of the countersunk head bolts 44, 46, and 48, a tension can be introduced which, through the contact between the essentially cylindrical inner recess 30 and the support section 34, is converted into a surface pressure in the region of the prop ring surface pairing 10, 14. This force flux occurs in an identical way in three radial planes which are at the same angular distance to one another. Due to this, the coupling obtains a moment of resistance against bending that is essentially uniform around the periphery.

To make available a torsion-resistance connection between the parts 2 and 4, a claw connection described in more detail below is provided. For this purpose, the drive ring 16 has, on the side facing away from the conical inner support surface 32, two diametrically offset claw extensions 56 that engage with fit into corresponding slot-like recesses 58 in the centering extension 6. Of course the dimensions of the centering extension 6, the depth of the slot-like recesses 58, the height of the claw extensions 56, the axial structural length of the drive ring 16, and the depth of the cylindrical recess 12 are matched to one another so that, in the closed state of the coupling, an axial clearance $S_A$ remains between each claw extension 56 and the base of the corresponding slot-like recess 58, as well as an axial clearance $S_B$ between the front end 60 of the centering extension 6 and the front end 62 of the drive ring 16.

Figure 2:
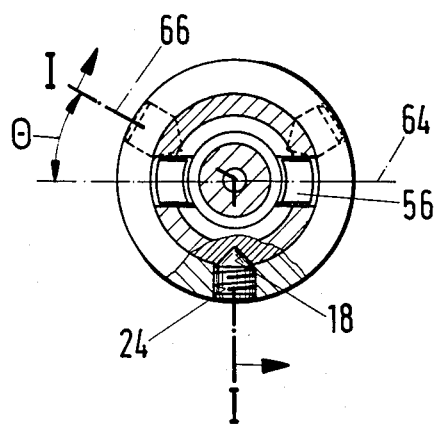
FIG. 2 is a sectional view along the line II—II in FIG. 1.

From FIG. 2 it becomes clear than an axial plane of symmetry 64 of the claw extension 56 is offset by the angle $\theta$ of 30° to a further axial plane 66 that runs through the middle of one of the conical indentations 18 in the drive ring 16. In this way it is possible, by changing the position of the drive ring 16, to index the relative position between the parts 2 and 4 in increments of 30°. The coupling is thus suited to a special extent for program controlled machine tools, even with stationary tools.

The mounting like a pendulum of the connecting rod 36 described above assures that tolerance-dependent alignment inaccuracies of the individual coupling parts have no effect on a transmission of tension free of transverse forces between the parts 2 and 4. Additionally, this hanging like a pendulum opens the possibility of disengaging or tightening the coupling with a single adjusting movement. For this purpose, countersunk head bolts 44 and 46 are formed as preset table carrying bolts, and only countersunk head bolt 48 is formed as a set screw that can be actuated by a hexagonal socket recess 68 by hand using a hexagonal socket wrench or by an automatically operating tool changer devices.

The carrying bolts 44 and 46 are formed as countersunk screws that are adjusted once during the production process in the closed state of the coupling and are then sealed. By screwing out the set screw 48, as this is shown by the dot-and-dash line in FIG. 3, the connecting rod 36 obtains an additional free space $R_F$ so that it can swing out of engagement with both carrying bolts 44 and 46, after which both the parts 2 and 4 can be separated. The coupling system described above is designed so that it can be used in every area of a modern tool system of a machine tool. Below, several advantageous possibilities of the use of this coupling system are described.

Figure 4:
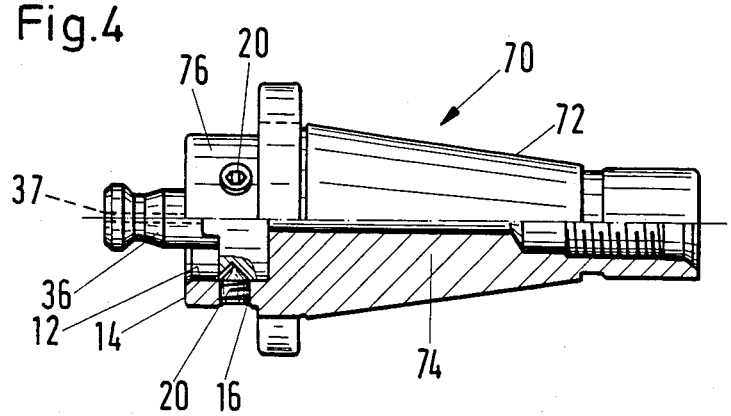
FIG. 4 is a side view shown partially in section of a base holding fixture for a tool system that is equipped with a coupling system according to FIGS. 13.

FIG. 4 shows, designated in general with reference symbol 70, a tool base holding fixture that has a clamping taper sleeve 72 for receipt in a tool spindle (not shown). The tool base holding fixture 70 can be designed so that it is suited for a central coolant supply. For this purpose, an inner hole 74 is provided through which coolant can be fed into the center of the shank tool. On the tool base holding fixture 70 a support flange 76 is provided that corresponds to the first part 2 of the coupling system shown in FIG. 1. In the support flange 76 there is the cylindrical recess 12 for receiving the drive ring 16, which is fixed by three countersunk head bolts 20 to be torsionally and axially resistant relative to the tool base holding fixture 70. The drive ring 16 in turn mounts the connecting rod 36 like a pendulum which, to make the central coolant supply possible, is provided with an inner hole 37.

It can be seen from FIG. 4 that, by the design described above of the coupling system, a relatively large ring-shaped planar bracing on the support surface 14 of the support flange 76 is made available so that, even with very long tool shafts, a high accuracy of concentricity and machining precision is assured.

Figure 5:
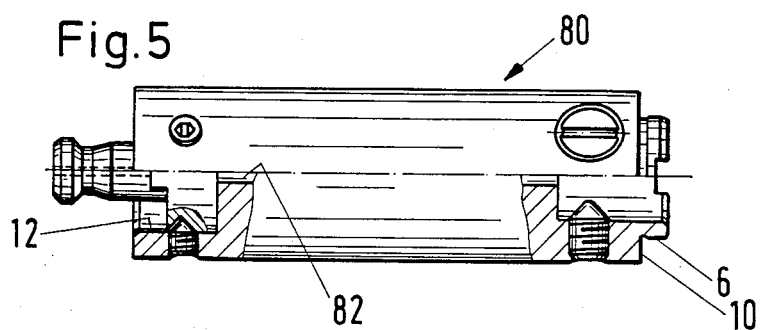
FIG. 5 is a side view shown partially in section of a shank extension piece that is equipped with a coupling system according to FIGS. 1-3.

On the support flange 76 according to FIG. 4, either the coupling counterpart of a tool shank can be coupled directly or a shank extension 80 according to FIG. 5 can be coupled. On the side facing the tool base holding fixture (i.e., the right side according to FIG. 5), the shank extension 80 carries the centering extension 6, and it forms the opposite prop ring surface (i.e., the ring-shaped rotating support surface 10) for the shank part that connects to the right side. An inner hole 82 in turn makes possible the feeding of lubricant or coolant to the actual tool cutting edge.

On the other side of shank extension 80, the counterpart to the coupling parts of the right side are provided. To shorten the description, this section is not further described. The shaping corresponds to the design in the region of the support flange 76 of FIG. 4.

Figure 6:
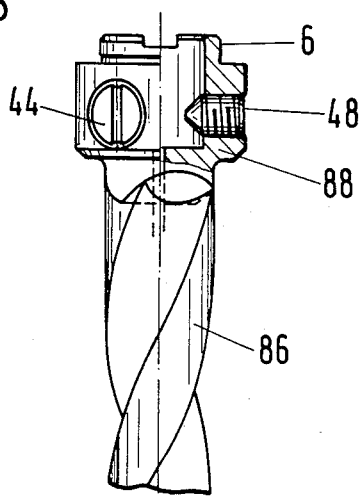
FIG. 6 is a side view of a spiral boring part that is provided on the side facing away from the tool application with a connection for the coupling system.

As mentioned above, it is also possible to couple the actual tool directly to the tool base holding fixture according to FIG. 4. In FIG. 6 this possibility is shown based on a signal part 86 of a boring tool that is connected with a drive 88. In this embodiment, the drive 88 is matched to the coupling system described above (i.e., it carries the carrying bolts 44, 46 and the set screw 48, and it forms the centering extension 6).

Figure 3:
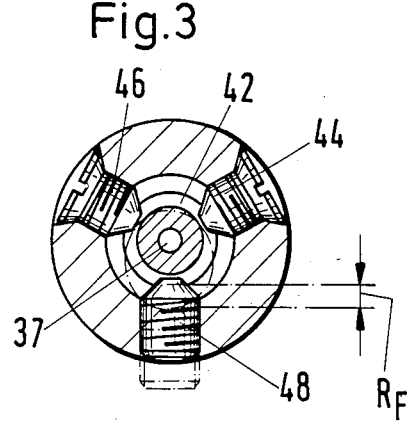
Figure 7:
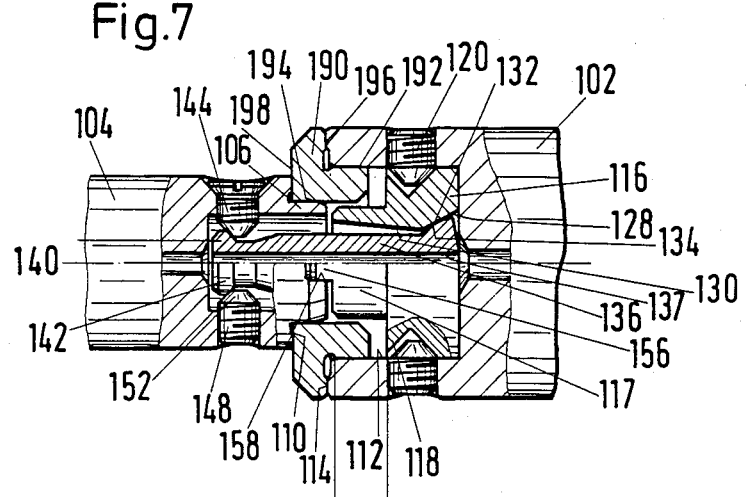
FIG. 7 is a view similar to that of FIG. 1 of a section through a modified embodiment of the coupling system for the production of a diameter reduction.

In FIG. 7 a variant of the coupling system described above is shown that is applied when there is a transition between different shank diameters. To simplify the description, those parts of this embodiment that correspond to the coupling parts of FIGS. 1 to 3 are provided with agreeing reference symbols which, however, have a 1 or a 10 placed in front of them.

Reference symbol 102 designates the first shank part, and reference symbol 104 designates the second shank part, the diameter of which is one or more sizes smaller than the diameter of the first shank part 102. To be able to use economically the coupling system described above even for this case when there is little demand for building space, the geometries of the end regions of parts 102, 104 to be coupled are left unchanged. That is, the same countersunk head bolts 120 are used in the region of the shank part 102 or—with the correspondingly decreased dimensions—the same countersunk head bolts 144, 146, 148 in the region of the second shank part 104. The coupling system undergoes a matching only by a new design of three parts—namely, drive ring 116, the connecting rod 136, and an intermediate ring 190.

The intermediate ring 190 has two centering sections 192 and 194, one of which is in fitting engagement with the cylindrical recess 112 in the first shank part 102 and the other of which is in fitting engagement with the centering extension 106 of the second shank part 104. Further, the intermediate ring 190 has two plane surfaces 196 and 198 which interact with the ring-shaped rotating support surfaces 110 and the support surface 114 of the shank parts 102 or 104.

The drive ring 116 corresponds, in the base contact surface 128, identically to the drive ring 16 according to FIG. 1. Differing from the drive ring 16, the drive ring 116 merges by way of a radial shoulder into an adapter extension 117, the length of which is matched to the distance $D_A$ between the plane surfaces 196, 198 of the intermediate ring 190. On the adapter extension 117, the claw extensions 156 are again formed which are, with the groovelike recesses 158, as described above, in fitting engagement with the centering extension 106.

Likewise, the connecting rod 136 is extended by a dimension matched to the distance $D_A$, and the connecting rod 136 can again have a centered recess 137. Through a mandrel 140, which is in adjacent contact with the conical inner support surface 132, and the conical section 142, an axial placement under tension again occurs, and thus an axial pressing together of the parts 102 and 104. By the pendulum mounting of the connecting rod 136, no transverse forces can be introduced on the parts 102 and 104.

To make the pendulum movement of the connecting rod 136 easier, the drive ring 116 has an essentially cylindrical inner recess 130 that expands conically toward the second shank part 104 so that, after disengaging the set screws 148, the mandrel 140 can swing out of engagement with the carrying bolts 144 and 146).

It becomes clear from the description above that a multistep reduction in the shank diameter needs no more axial structural space than a single-step reduction. Further, it becomes clear that, for such a reduction, only three individual parts (namely, the drive ring 116, the intermediate ring 190, and the connecting rod 136) must be interchanged, by which the economy of the use of the coupling system is additionally improved, and the field of application is broadened.

Otherwise the advantages described in connection with the embodiment according to FIGS. 1 to 3 also apply for this embodiment. The indexing and torsion safety through both claw extension 156 that are offset by 180° opens the further possibility, especially in connection with the threefold adjustable drive ring 116, of a position indexing of both parts 102 and 104 in angular increments of 30°.

Figure 8:
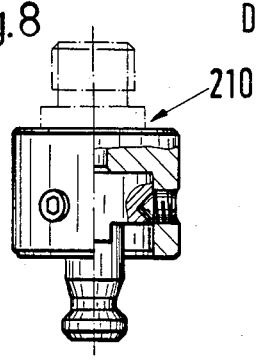
FIGS. 8 and 9 are side views shown partially in section of adaptors that are matched to the coupling system.
Figure 9:
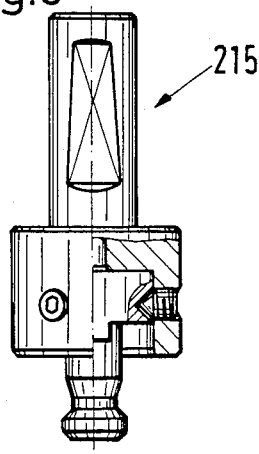

FIGS. 8 and 9 show further possibilities of how the coupling system can be connected with a modern tool system. In these cases the coupling component shown in FIG. 1 on the right side is formed on adapters 210 or 215, with which a connection to other tool clamping systems can be made.

Figure 10:
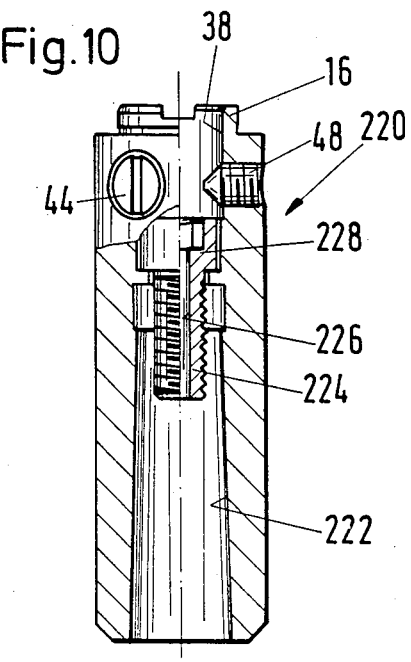
FIG. 10 is a sectional view of a further tool system part that is matched to the coupling system.

FIG. 10 shows, in a diagram similar to FIG. 6, a further possibility of incorporating the coupling system into a modern tool system. In this case, the coupling region shown on the left side of FIG. 1 is formed on a tool holding fixture 220 that has an inner cone 222 for receiving a tool that is clamped by an axial safety screw 224 with the central coolant borehole 226. By inner hole 37 or the central recess 137 in the connecting rod 36 or 136, the feeding of the central coolant borehole 226 with cooling agent or lubricant can occur uninterruptedly. In the disengaged state of the coupling, a head 228 of the axial safety screw 224 is freely accessible from the recess 38. With regard to the position of the screw head 228, there is the sole condition to be maintained that it must lie beneath the mandrel of the connecting rod (not shown in more detail in FIG. 10).

It becomes clear from the description above that the coupling system described can be used for combining the most varied tool parts of a tool system and that the same coupling principle can be used throughout while retaining the centering and adjusting devices. In doing so the coupling system is designed so that the centering extension is provided on that tool part that lies closer to the tool cutting edge.

Figure 11:
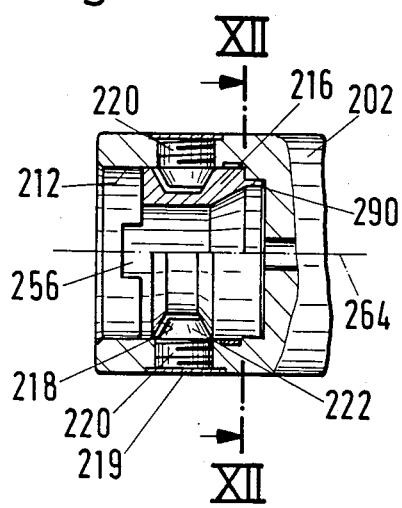
FIG. 11 is a partial sectional view of a further embodiment of the coupling system in which only half of the system is shown.
Figure 12:
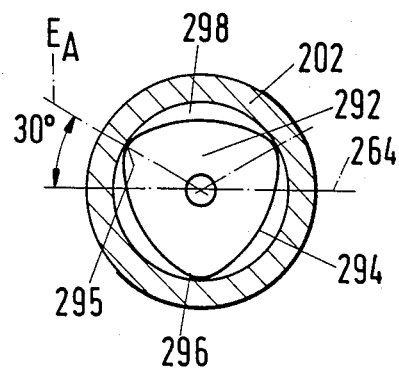
FIG. 12 is a view of the holding fixture of the embodiment according to FIG. 11 in a section cut along the line XII—XII in FIG. 11.

FIGS. 11 and 12 show a further variant of the coupling system. Since the variation of this embodiment relative to the systems described previously is limited to one of the parts to be coupled, only this part is shown in the diagram. The first shank part 202 is again formed for receiving a drive ring 216, which nevertheless, differing from the embodiments described above, has on the side facing away from the claw extensions 256 a drive extension 290 for interlocking engagement into a correspondingly formed indentation 292 in the cylindrical recess 212. The drive extension 290 essentially has the shape of a hollow prism with outer surfaces 294 that are preferably arched convex, while the edges 296 of the drive extension 290 are rounded. The numeral 298 designates a radial shoulder against which the drive ring 216 can be pressed. For this purpose, several fastening bolts 220 are provided which are distributed equidistantly around the periphery and which form, in the region of their tip, taper sleeve surfaces 222 for engagement into a V-shaped slot 218. The fastening bolts 220 are covered by a covering cap 219.

It can be seen from the diagram that the plane of symmetry 264 of the claw extensions 356 encloses, with axial plane $E_A$ that runs through a vertex of the drive extension 290, an angle of 30°, by which an indexing of the parts to be coupled to the part 202 is possible in angular increments of 30°.

Figure 13:
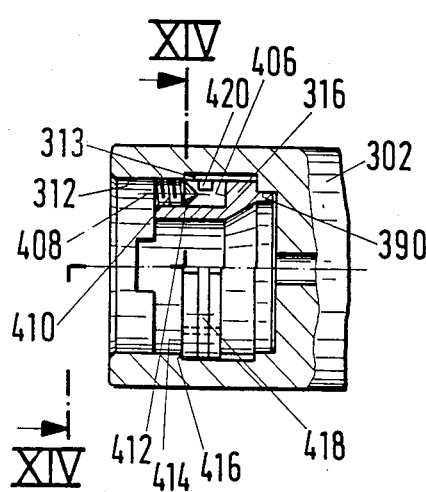
FIG. 13 is a view similar to that of FIG. 11 of a further embodiment of the coupling system.
Figure 14:
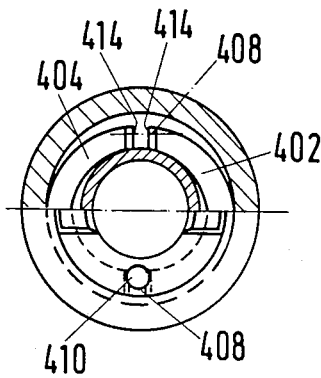
FIG. 14 is a view of the coupling system according to FIG. 13 in a section cut along the line XIV—XIV in FIG. 13.

A further embodiment of the coupling system is shown in FIGS. 13 and 14. This embodiment differs from the variant shown in FIGS. 11 and 12 with regard to the position fixing of the drive ring, which is designated by 316 in the embodiment according to FIGS. 13 and 14. The shank part 302 again has a holding fixture 312 for the drive ring 316 which, as in the embodiment according to FIGS. 11 and 12, is equipped with a drive extension 390. With regard to the drive extension 390, the embodiment according to FIGS. 13 and 14 does not differ from the one according to FIGS. 11 and 12, so that a more detailed description is not needed. To fix the position of the drive ring 316 in the first shank part 302, a divided retaining ring is provided that has two retaining ring segments 402 and 404. The retaining ring segments 402 and 404 are supported fittingly in a rectangular slot 406 of the drive ring 316. For the retaining ring segments 402 and 404, in the cylindrical recess 312 a perforation 313 is provided into which the retaining ring segments 402 and 404 can be moved. For this purpose, the drive ring 316 has two diametrically offset tapped holes 408 into which axially oriented fixing screws 410 can be screwed. Each of the axially oriented fixing screws 410 has a conical tip 412. The conical tips 412 interact with wedge surfaces 414 of the retaining ring segments 402 and 404 so that, when tightening the fixing screws 410, a moving apart of the retaining ring segments 402 and 404 into the perforation 313 occurs. In this way the drive ring 316 is kept axially immovable in the part 302.

To be able to cause, during the pressing outward of the retaining ring segments 402 and 404, an axial bracing of the drive ring 316, it can be provided that mating surface 414 that faces the fixing screw 410 can be formed conically, and the graduated surface 416 of the perforation 313 can match this cone so that, when spreading apart, both conical surfaces lie flat against each other, and thus a pressing of the drive ring 316 against the base of the recess 312 occurs.

To assure that the drive ring 316 together with the retaining ring segments 402 and 404 can be removed from recess 312 without problems in the disengaged state of the fixing screws 410, an annular slot 418 is formed on the cylindrical outer surface of the retaining ring segments 402 and 404, and in the annular slot 418 an elastic ring 420 is received which keeps the retaining ring segments 402 and 404 radially inwardly adjacent to the base of the annular slot 406. In this state, the retaining ring segments 402 and 404 do not protrude beyond the inner diameter of the cylindrical recess 312.

In contrast to the embodiment shown, it is also possible to increase the number of retaining ring segments and to provide a corresponding number of fixing screws.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A cutting shank tool comprising:
   (a) a first part having:
      (i) a longitudinal axis and
      (ii) a cylindrical recess coaxial with said longitudinal axis;
   (b) a second part having:
      (i) a longitudinal axis coaxial with said longitudinal axis of said first part;
      (ii) a centering extension coaxial with said longitudinal axis of said first part; and
      (iii) a cylindrical recess coaxial with said longitudinal axis of said first part;
   (c) a connecting rod that:
      (i) is coaxial with said longitudinal axis of said first part;
      (ii) is mounted by means that allow movement like a pendulum in said first part;
      (iii) extends into said cylindrical recess in said second part; and
      (iv) has a conical groove around its periphery inside said cylindrical recess in said second part; and
   (d) a plurality of adjusting devices that:
      (i) project radially from said second part and
      (ii) are received in said conical groove in said connecting rod,
   whereby said connecting rod can be placed under tension between said first part and said plurality of adjusting devices.

2. A cutting shank tool as recited in claim 1 wherein said plurality of adjusting devices includes a set screw that is threadly received in said second part.

3. A cutting shank tool as recited in claim 2 where said connecting rod can be pressed by said set screw against two further supporting surfaces;
   (a) that are located on others of said plurality of adjusting devices and
   (b) that match the point of said set screw.

4. A cutting shank tool as recited in claim 3 wherein said further support surfaces are formed on adjustable screws located in the same radial plane as said set screw.

5. A cutting shank tool as recited in claim 4 wherein said set screw and said adjustable screws are equiangularly spaced.

6. A cutting shank tool as recited in claim 4 wherein said adjustable screws are sealed after having been initially positioned.

7. A cutting shank tool as recited in claim 1 and further comprising a drive ring:
   (a) that is mounted in said cylindrical recess in said first part;
   (b) that mounts said connecting rod; and
   (c) that has, on the side facing said second part, claw extensions for fitting engagement into corresponding recesses in said centering extension on said second part.

8. A cutting shank tool as recited in claim 7 wherein two diametrically offset claw extensions are formed in said drive ring.

9. A cutting shank tool as recited in claim 7 wherein said drive ring is detachably received in said cylindrical recess in said first part.

10. A cutting shank tool as recited in claim 9 wherein:
    (a) three conical recesses are located in the outer peripheral surface of said drive ring and spaced equiangularly from one another and
    (b) three fastening screws are threadly received in said first part, each one of said three fastening screws having a point received in a corresponding one of said three conical recesses.

11. A cutting shank tool as recited in claim 10 wherein said drive ring can be pressed by said fastening screws against a base contact surface in said cylindrical recess in said first part.

12. A cutting shank tool as recited in claim 10 wherein:
    (a) two diametrically offset claw extensions are formed on said drive ring;
    (b) said two diametrically offset claw extensions define a plane of symmetry; and
    (c) said plane of symmetry is located at 30° in an axial plane to another axial plane that runs through the center of one of said three conical recesses.

13. A cutting shank tool as recited in claim 9 wherein said drive ring has, on the side facing away from said claw extensions, a radially offset drive extension for interlocking engagement in a correspondingly shaped indentation in said cylindrical recess in said first part.

14. A cutting shank tool as recited in claim 13 wherein said drive extension has the form of a hollow prism the outer surfaces of which are arched and convex.

15. A cutting shank tool as recited in claim 14 wherein the edges of said drive extension are rounded.

16. A cutting shank tool as recited in claim 14 wherein:
    (a) said drive extension has an at least approximately polygonal cross section and (b) the number of corners of said drive extension can be divided evenly by three.

17. A cutting shank tool as recited in claim 14 wherein an axial plane that runs through a vertex of said drive extension encloses, with the plane of symmetry of said claw extension, an angle of 30°.

18. A cutting shank tool as recited in claim 13 wherein:
    (a) said drive ring has, on its outer surface, a V-shaped annular tee slot and
    (b) a plurality of fastening screws are threadly received in said first part, each one of said plurality of fastening screws have a point received in said V-shaped annular tee slot.

19. A cutting shank tool as recited in claim 13 wherein:
    (a) said drive ring has, on its outer surface, a rectangular slot;
    (b) said cylindrical recess in said first part has, on its inner surface, a corresponding perforation;
    (c) a divided retaining ring is received in said rectangular slot; and
    (d) said divided retaining ring can be forced into said corresponding perforation by at least one fixing screw threadly mounted in said first part and projecting into said cylindrical recess in said first part.

20. A cutting shank tool as recited in claim 19 wherein:
    (a) said divided retaining ring has mating surfaces on its faces;
    (b) one of said mating surfaces braces planar on a shoulder of said rectangular slot that faces away from said claw extension; and
    (c) another one of said mating surfaces, in the spread state of said divided retaining ring, braces against a graduated surface of said corresponding perforation.

21. A cutting shank tool as recited in claim 19 where said divided retaining ring can be spread apart by at least one expansion screw that can be screwed axially into said drive ring and that has a tapered tip that can be pressed against supporting surfaces, placed wedge-shaped to one another, of adjacent segments of said divided retaining ring.

22. A cutting shank tool as recited in claim 19 wherein said divided retaining ring has on its outer peripheral surface an annular slot in which an elastic clamping ring is received.

23. A cutting shank tool as recited in claim 7 wherein said drive ring has a conical inner support surface with which a convex, arched support section of said connecting rod is in abutting contact.

24. A cutting shank tool as recited in claim 7 wherein said second part is centered relative to said first part by an intermediate ring and tensible against said first part.

25. A cutting shank tool as recited in claim 24 wherein:
    (a) said intermediate ring has a centering section that is in fitting engagement with said cylindrical recess in said first part and
    (b) said centering section has a centering inner surface that receives said centering extension.

26. A cutting shank tool as recited in claim 25 wherein said drive ring merges, by way of a radial shoulder, into an adaptor extension that lies radially inside said intermediate ring.

27. A cutting shank tool as recited in claim 1 wherein said connecting rod has a continuous inner hole.

28. A cutting shank tool as recited in claim 1 wherein said first part is a part of a tool base holding fixture for attachment to a machine spindle.

29. A cutting shank tool as recited in claim 1 wherein said first part is a part of a shank elongation that forms, on its end facing the corresponding cutting tool, a holding fixture and that form, on its other end, a centering extension for a further coupling.

30. A cutting shank tool as recited in claim 1 wherein said first part is a part of an adaptor for a tool base holding fixture.

31. A cutting shank tool as recited in claim 1 wherein said second part is a part of a boring tool shank.

32. A cutting shank tool as recited in claim 1 wherein said second part is a part of a drive for a boring tool spiral part.

33. A cutting shank tool as recited in claim 1 wherein said second part is a part of a tool holding fixture.

34. A cutting shank tool as recited in claim 33 wherein:
    (a) said tool holding fixture has an inner tapered sleeve into which a clamping bolt projects and
    (b) said clamping bolt has a head which braces against a shoulder formed beneath one of said plurality of adjusting devices.

35. A cutting shank tool as recited in claim 34 wherein said clamping bolt has a continuous inner recess.

36. A cutting shank tool as recited in claim 2 and further comprising a drive ring:
    (a) that is mounted in said cylindrical recess in said first part;
    (b) that mounts said connecting rod; and
    (c) that has, on the side facing said second part, claw extensions for fitting engagement into corresponding recesses in said centering extension on said second part.

37. A cutting shank tool as recited in claim 3 and further comprising a drive ring:
    (a) that is mounted in said cylindrical recess in said first part;
    (b) that mounts said connecting rod; and
    (c) that has, on the side facing said second part, claw extensions for fitting engagement into corresponding recesses in said centering extension on said second part.

38. A cutting shank tool as recited in claim 4 and further comprising a drive ring:
    (a) that is mounted in said cylindrical recess in said first part;
    (b) that mounts said connecting rod; and
    (c) that has, on the side facing said second part, claw extensions for fitting engagement into corresponding recesses in said centering extension on said second part.

39. A cutting shank tool as recited in claim 14 wherein:
(a) said drive ring has, on its outer surface, a V-shaped annular tee slot and
(b) a plurality of fastening screws are threadedly received in said first part, each one of said plurality of fastening screws having a point received in said V-shaped annular tee slot.

40. A cutting shank tool as recited in claim 15 wherein:
(a) said drive ring has, on its outer surface, a V-shaped annular tee slot and
(b) a plurality of fastening screws are threadedly received in said first part, each one of said plurality of fastening screws having a point received in said V-shaped annular tee slot.

41. A cutting shank tool as recited in claim 16 wherein:
(a) said drive ring has, on its outer surface, a V-shaped annular tee slot and
(b) a plurality of fastening screws are threadedly received in said first part, each one of said plurality of fastening screws having a point received in said V-shaped annular tee slot.

42. A cutting shank tool as recited in claim 17 wherein:
(a) said drive ring has, on its outer surface, a V-shaped annular tee slot and
(b) a plurality of fastening screws are threadedly received in said first part, each one of said plurality of fastening screws having a point received in said V-shaped annular tee slot.

43. A cutting shank tool as recited in claim 14 wherein:
(a) said drive ring has, on its outer surface, a rectangular slot;
(b) said cylindrical recess in said first part has, on its inner surface, a corresponding perforation;
(c) a divided retaining ring is received in said rectangular slot; and
(d) said divided retaining ring can be forced into said corresponding perforation by at least one fixing screw threadedly mounted in said first part and projecting into said cylindrical recess in said first part.

44. A cutting shank tool as recited in claim 15 wherein:
(a) a drive ring has, on its outer surface, a rectangular slot;
(b) said cylindrical recess in said first part has, on its inner surface, a corresponding perforation;
(c) a divided retaining ring is received in said rectangular slot; and
(d) said divided retaining ring can be forced into said corresponding perforation by at least one fixing screw threadedly mounted in said first part and projecting into said cylindrical recess in said first part.

45. A cutting shank tool as recited in claim 16 wherein:
(a) said drive ring has, on its outer surface, a rectangular slot;
(b) said cylindrical recess in said first part has, on its inner surface, a corresponding perforation;
(c) a divided retaining ring is received in said rectangular slot; and
(d) said divided retaining ring can be forced into said corresponding perforation by at least one fixing screw threadedly mounted in said first part and projecting into said cylindrical recess in said first part.

46. A cutting shank tool as recited in claim 17 wherein:
(a) said drive ring has, on its outer surface, a rectangular slot;
(b) said cylindrical recess in said first part has, on its inner surface, a corresponding perforation;
(c) a divided retaining ring is received in said rectangular slot; and
(d) said divided retaining ring can be forced into said corresponding perforation by at least one fixing screw threadedly mounted in said first part and projecting into said cylindrical recess in said first part.

47. A cutting shank tool as recited in claim 13 wherein:
(a) said intermediate ring has a centering section that is in fitting engagement with said cylindrical recess in said first part and
(b) said centering section has a centering inner surface that receives said centering extension.

48. A cutting shank tool as recited in claim 19 wherein:
(a) said intermediate ring has a centering section that is in fitting engagement with said cylindrical recess in said first part and
(b) said centering section has a centering inner surface that receives said centering extension.

49. A cutting shank tool as recited in claim 9 wherein said second part is centered relative to said first part by an intermediate ring and tensible against said first part.

50. A cutting shank tool as recited in claim 13 wherein said second part is centered relative to said first part by an intermediate ring and tensible against said first part.

* * * * *